United States Patent [19]
Goldburt et al.

[11] Patent Number: 5,637,258
[45] Date of Patent: Jun. 10, 1997

[54] METHOD FOR PRODUCING RARE EARTH ACTIVITED METAL OXIDE NANOCRYSTALS

[75] Inventors: Efim T. Goldburt, Chappaqua; Rameshwar N. Bhargava, Briarcliff Manor; Bharati S. Kulkarni, Cortlandt Manor, all of N.Y.

[73] Assignee: Nanocrystals Technology L.P., Briarcliff Manor, N.Y.

[21] Appl. No.: 617,345

[22] Filed: Mar. 18, 1996

[51] Int. Cl.⁶ .......................... C01F 17/00; C09K 11/77; C09K 11/54
[52] U.S. Cl. .................. 252/301.4 R; 252/301.4 F; 252/301.6 R; 423/263; 423/604; 423/608; 423/622
[58] Field of Search .................. 501/12; 252/301.4 R, 252/301.6 R, 301.4 F; 423/263, 604, 608, 622

[56] References Cited

U.S. PATENT DOCUMENTS

| | | | |
|---|---|---|---|
| 4,507,245 | 3/1985 | Ozaki et al. | 156/DIG. 63 |
| 4,968,498 | 11/1990 | Wautier et al. | 423/263 |
| 5,106,828 | 4/1992 | Bhargava et al. | 501/12 |

FOREIGN PATENT DOCUMENTS 294723  10/1991  Germany ................ 252/301.4 R

OTHER PUBLICATIONS

*Organic Chemistry A Short Course*; Hart, ed., 1991 no month.

*Primary Examiner*—Melissa Bonner
*Attorney, Agent, or Firm*—William L. Botjer

[57] ABSTRACT

A process for the production of metal oxide nanocrystalline phosphors activated with a rare earth, line emitting, element. The nanocrystal oxides are produced by a sol-gel like process. The process begins with an n-butoxide solution of the host and activator which is first subject to acetolysis which will cause the pH of the solution to change from basic to acidic. This is followed by the addition of water in a hydrolysis step which forms a host/activator hydroxide solution. To the host/activator hydroxide solution, sodium hydroxide, which is very basic, is added, which will cause the precipitation of host oxide nanocrystals activated with the activator. The host/activator n-butoxide precursors may be synthesized by azeotropic distillation.

18 Claims, No Drawings

METHOD FOR PRODUCING RARE EARTH ACTIVITED METAL OXIDE NANOCRYSTALS

STATEMENT OF GOVERNMENT SUPPORT OF INVENTION

The work resulting in this invention was supported by ARPA contract No. N61331-95-0013.

BACKGROUND AND SUMMARY OF THE INVENTION

This invention relates to improved processes for producing doped quantum sized particles. More particularly this invention is directed to process for producing improved doped quantum sized oxide particles.

The unique physical properties of quantum sized particles (i.e. 1–100 Angstroms in diameter) called "nanocrystals" have attracted scientific interest. Because of their quantum size these nanocrystals exhibit properties that are far different from their bulk (larger sized) counterparts. However, the great majority of the quantum sized particles that have been studied and produced have been undoped. Doped (or "activated") quantum sized particles have unique properties which differ from non quantum sized particles of the same composition and from non-activated quantum sized particles.

In common terminology in this art a host particle that has been "doped" generally refers to a particle that has less than 1.0% of the doping element. Despite the low percentage of the dopant the host has the properties of the doping particle. When the percentage of the dopant exceeds 1.0% the particle is generally referred to as an alloy. However, in certain applications, particularly when dealing with nanocrystals, the particle may act as if it were doped (ie. its properties are governed by the activator) even though it contains greater than 1.0% of a "dopant". Accordingly in this application we will refer to "activated" host particles to include host particles which include amounts of both greater and less than 1.0% of the activator element. Thus $Y_2O_3$:Eu refers to a Yttrium oxide host doped or activated with Europium.

Only very recently has work been done to produce doped quantum sized particles. In U.S. patent application Ser. No. 08/050,693 entitled "Method of manufacturing Quantum Sized Doped Semiconductor Particles" filed Apr. 20, 1993; there is disclosed a heterogenous method for producing nanocrystals of zinc sulfide doped with manganese (ZnS:Mn) in a polymer matrix. In U.S. patent application Ser. No. 08/318,034 filed Oct. 4, 1994 entitled "Encapsulated Quantum Sized Doped Semiconductor particles and method of manufacturing Same" there is disclosed an organometallic process for producing doped ZnS:Mn nanocrystals.

In U.S. patent application Ser. No. 08/540,224 filed Oct. 6, 1995 entitled "Method for producing ZnS Nanocrystals Doped with A 3+ Element" a process for producing ZnS nanocrystals doped with line emitting rare earth elements is disclosed which are particularly suitable for use as phosphors. However, the doped nanocrystals produced by the above described processes are basically directed to sulfide host compounds. Sulfides and similar host compounds produced by these processes are highly reactive with air and other compounds which may render the nanocrystals unusable. Indeed the nanocrystals produced by these processes have been encapsulated by a matrix or surface acting agents to reduce reactivity.

The present invention is directed to producing activated oxide nanocrystals which are self passivating and far less reactive than sulfides. The oxide nanocrystals are produced by a "sol-gel" like process rather than the organometallic processes previously used to provide doped sulfide nanocrystals. The process begins with an n-butoxide/butanol solution of the host and activator which is first subject to acetolysis which will cause the pH of the solution to change from basic to acidic. This is followed by the addition of water in a hydrolysis step which forms a host/activator hydroxide solution. To the host/activator hydroxide solution, sodium hydroxide, which is very basic, is rapidly added, which will cause the precipitation of host oxide nanocrystals activated with the activator. The host/activator n-butoxide precursors may be synthesized by azeotropic distillation.

The activator elements used in the present invention are the rare earth elements. In a doped or activated phosphor the characteristic light emitted by the phosphor when energized is controlled by the dopant or activator, not the host material such as yttrium oxide ($Y_2O_3$). When used as dopants or activators in phosphors the so called "rare earth" elements have narrow spectrum light emission. A phosphor doped with Europium (Eu) will emit red light, Terbium (Tb) will emit green and Thulium (Tm) blue. Thus phosphors doped with these three elements may be used to generate a full color RGB display device. Additionally, other rare earth dopants may be used to generate emissions outside of the visible spectrum, cerium (Ce) and gadolinium (Gd) will generate ultraviolet light and Erbium (Er) will emit infrared.

DETAILED DESCRIPTION OF THE PREFERRED EMBODIMENTS

In the sol-gel like process of the invention, which may be carried out at room temperature, a solution of Y—Eu n-butoxide [Y—Eu(On—Bu)$_x$] in Butanol ($C_4H_9OH$) is used. Alternatively n-butoxide solutions of Yttrium and the activator element may be prepared as is described in detail below. In an acetolysis reaction, acetic acid ($CH_3COOH$) is added to the Y—Eu butoxide/butanol solution as follows:

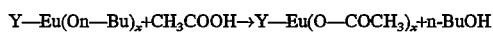

Y—Eu(On—Bu)$_x$+CH$_3$COOH→Y—Eu(O—COCH$_3$)$_x$+n-BuOH

This reaction produces Y—Eu acetate and n-butanol which is mixed and stored for 0.5–1.0 hour. The pH of Y—Eu (On—Bu)$_x$ is ≈8.0 and is thus basic, upon the addition of acetic acid the pH is driven down to ≈5.0 which is quite acidic. To the above solution water is added in a hydrolysis reaction to form Y—Eu hydroxide:

Y—Eu(O—COCH$_3$)$_x$+n-BuOH+H$_2$O→Y—Eu(OH)+OH

Added to the Y—Eu hydroxide solution is sodium hydroxide (NaOH) in an aqueous solution at 85° C., which has a pH of 13.5, and which will cause the precipitation of europium activated yttrium oxide nanocrystals ($Y_2O_3$:Eu) as follows:

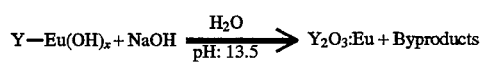

$$Y—Eu(OH)_x + NaOH \xrightarrow[pH: 13.5]{H_2O} Y_2O_3:Eu + Byproducts$$

Thereafter, the precipitated nanocrystal particles are washed with water and acetone to remove the organic byproducts. The particles are then dried and washed with dilute NaOH which has been found to increase the light output of the activated yttrium oxide nanocrystals.

The synthesis of Yttrium n-butoxide proceeds as follows, metallic sodium is reacted with iso-propanol to form sodium iso-propoxide as follows:

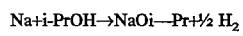

Na+i-PrOH→NaOi—Pr+½ H$_2$ to the solution YCl$_3$ is added to form Yttrium iso-propoxide as follows:

$YCl_3 + 3NaOi\text{—}Pr \rightarrow Y(Oi\text{—}Pr)_3 + 3NaCl$

To this solution n-Butanol is added to produce Yttrium n-butoxide by the exchange of isopropoxide to n-butoxide groups by azeotropic distillation in the following reaction:

$Y(Oi\text{—}Pr)_3 + n\text{-BuOH} \rightarrow Y(On\text{—}Bu)_3 + i\text{-PrOH}$ The synthesis of the n-butoxide activator compound proceeds in the same manner as that of the Yttrium butoxide from metallic sodium, iso-propanol and a chloride compound of the activator, with Eu as the activator the creation of Europium n-butoxide proceeds as follows:

$Na + i\text{-PrOH} \rightarrow NaOi\text{—}Pr + \frac{1}{2} H_2$ $EuCl_3 + 3NaOi\text{—}Pr \rightarrow Eu(Oi\text{—}Pr)_3 + 3NaCl$ $Eu(Oi\text{—}Pr)_3 + n\text{-BuOH} \rightarrow Eu(On\text{—}Bu)_3 + i\text{-PrOH}$ For activators other than europium, the reactions are identical with a chloride of the activator used.

The synthesized yttrium and activator n-butoxides are mixed together at 117° C. to form the yttrium/activator n-butoxide [ie. $Y\text{—}Eu(On\text{—}Bu)_x$] used in the sol gel like process to provide activated $Y_2O_3$ nanocrystals as described in detail above. In the mixture of the yttrium and activator n-butoxides, the amount of the yttrium n-butoxide exceeds that of the activator. A preferred mixture of yttrium n-butoxide and activator n-butoxide includes 18%, by volume, of the activator n-butoxide and 82% of the yttrium n-butoxide. Depending on the amount of activator desired in the final activated metal oxide the amount of activator n-butoxide in the mixture may range from 5 to 25%.

In addition to yttrium oxide other suitable metal oxide hosts for production by the present process include zirconium oxide ($ZrO_2$), zinc oxide (ZnO), gadolinium oxide ($Gd_2O_3$), praseodymium oxide ($Pr_2O_3$), lanthanum oxide ($La_2O_3$), and copper oxide (CuO or $Cu_2O$) and their alloys. Suitable activators include the rare earth elements, (europium, terbium, thulium, cerium, gadolinium, holmium, samarium and neodymium). The transition metals (manganese, copper, silver, cobalt, nickel, and iron) may also be used as activators for various applications.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A process for producing yttrium oxide host nanocrystals having diameters of less than 100 angstroms, said nanocrystals being activated with a rare earth activator, the process comprising the steps of:
    a) providing a n-butoxide first solution containing yttrium and the activator in a compatible solvent;
    b) adding acetic acid to the first solution to form a yttrium-activator acetate;
    c) adding water to the first solution to hydrolyze the yttrium-activator acetate to form a hydroxide compound of the yttrium and the activator; and
    d) adding sodium hydroxide to the solution to precipitate yttrium oxide nanocrystals activated with the activator.

2. The process as claimed in claim 1 wherein the activator is selected from the group consisting of europium, terbium, thulium, cerium, gadolinium, holmium, samarium and neodymium.

3. The process as claimed in claim 1 wherein the n-butoxide first solution is provided by the mixture of Yttrium n-butoxide and an n-butoxide of the activator, with the n-butoxide of the activator being 5–25% by volume of the mixture.

4. The process as claimed in claim 1 further including the step of producing the n-butoxide compounds of the host and activator by exchange of iso-propoxide groups for n-butoxide groups.

5. The process as claimed in claim 4 wherein the step of exchanging the iso-propoxide groups for n-butoxide groups is accomplished by azeotropic distillation.

6. The process as claimed in claim 4 further including the step of forming the iso-propoxide groups from the reaction of sodium iso-propoxide with a chloride compound containing at least one of the host and activator.

7. The process as claimed in claim 6 further including the step of forming the sodium iso-propoxide from the reaction of sodium with iso-propanol.

8. The process as claimed in claim 1 wherein the solvent is n-butanol.

9. A process for producing host metal oxide nanocrystals having diameters of less than 100 angstroms, said nanocrystals being activated with an activator element, the process comprising the steps of:
    a) providing a host/activator n-butoxide first solution in a compatible solvent;
    b) adding acetic acid to the first solution to form a host-activator acetate;
    c) adding water to the first solution to hydrolyze the host-activator acetate to form a hydroxide compound of the host and the activator; and
    d) rapidly adding sodium hydroxide to the solution to precipitate host oxide nanocrystals activated with the activator.

10. The process as claimed in claim 9 wherein the activator element is a rare earth element selected from the group consisting of europium, terbium, thulium, cerium, gadolinium, holmium, samarium and neodymium.

11. The process as claimed in claim 9 wherein the host metal oxide is selected from the group consisting of yttrium oxide, zirconium oxide ($ZrO_2$), zinc oxide (ZnO), gadolinium oxide ($Gd_2O_3$), praseodymium oxide ($Pr_2O_3$), lanthanum oxide ($La_2O_3$), and copper oxide (CuO or $Cu_2O$).

12. The process as claimed in claim 9 wherein the n-butoxide first solution is provided by the mixture of n-butoxide compound of the host and an n-butoxide compound of the activator, with the n-butoxide of the activator being 5–25% by volume of the mixture.

13. The process as claimed in claim 12 wherein at least one of the n-butoxide compounds of the host and activator is provided by exchange of iso-propoxide groups by n-butoxide groups.

14. The process as claimed in claim 13 further including the step of exchanging the iso-propoxide groups for n-butoxide groups by azeotropic distillation.

15. The process as claimed in claim 13 further including the step of forming the iso-propoxide groups from the reaction of sodium iso-propoxide with a chloride compound containing at least one of the host and activator.

16. The process as claimed in claim 15 further including the step of forming the sodium iso-propoxide from the reaction of sodium with iso-propanol.

17. The process as claimed in claim 9 wherein the solvent is n-butanol.

18. The process as claimed in claim 9 wherein the activator element is a transition metal selected from the group consisting of maganese, copper, silver, cobalt, nickel, and iron.

* * * * *